(12) United States Patent
Srivastava

(10) Patent No.: US 10,593,078 B2
(45) Date of Patent: Mar. 17, 2020

(54) REFORMATING PIXELS THAT REPRESENT OBJECTS

(71) Applicant: Oracle International Corporation, Redwood Shores, CA (US)

(72) Inventor: Manish Srivastava, Cary, NC (US)

(73) Assignee: Oracle International Corporation, Redwood Shores, CA (US)

( * ) Notice: Subject to any disclaimer, the term of this patent is extended or adjusted under 35 U.S.C. 154(b) by 11 days.

(21) Appl. No.: 15/289,821

(22) Filed: Oct. 10, 2016

(65) Prior Publication Data
US 2017/0024914 A1    Jan. 26, 2017

Related U.S. Application Data

(63) Continuation of application No. 13/761,614, filed on Feb. 7, 2013, now Pat. No. 9,495,777.

(51) Int. Cl.
| | |
|---|---|
| *G06T 11/20* | (2006.01) |
| *G06F 3/0482* | (2013.01) |
| *G06F 3/0484* | (2013.01) |
| *G06F 3/0485* | (2013.01) |
| *G06F 17/22* | (2006.01) |

(Continued)

(52) U.S. Cl.
CPC .......... *G06T 11/206* (2013.01); *G06F 3/0482* (2013.01); *G06F 3/04847* (2013.01); *G06F 3/04855* (2013.01); *G06F 17/2247* (2013.01); *G06F 17/2294* (2013.01); *G06F 17/246* (2013.01); *G06F 3/04883* (2013.01)

(58) Field of Classification Search
CPC .................................................. G06T 11/206
See application file for complete search history.

(56) References Cited

U.S. PATENT DOCUMENTS

| | | | |
|---|---|---|---|
| 7,027,052 B1 * | 4/2006 | Thorn | G06T 11/206 345/440 |
| 8,773,436 B1 * | 7/2014 | Hao | G06T 11/206 345/440 |

(Continued)

OTHER PUBLICATIONS

J. E. Farrell, Brian L. Benson, and Carl R. Haynie, Predicting Flicker Thresholds for Video Display Terminals, 1987, In Proc. SID, vol. 28, No. 4, pp. 449-453. (Year: 1987).*

(Continued)

*Primary Examiner* — Jeffery A Brier
(74) *Attorney, Agent, or Firm* — Trellis IP Law Group, PC

(57) ABSTRACT

First user specified criteria is received at graphical user interface (GUI) software. A first visualization is automatically displayed, via the GUI software, based on the first user specified criteria. The first visualization is defined by a rectangular area having a fixed width dimension and variable height dimension. The first visualization includes pixels that each represent one of the objects. A particular pixel is at a first position in the visualization. A second user specified criteria that includes grouping criteria is received at the GUI software. Groups of categorized objects are created by categorizing the objects based on the second user specified criteria. A second visualization that includes the pixels is automatically displayed via the GUI software by automatically reformatting the particular pixel from the first position to a second position based on the second user specified criteria.

22 Claims, 6 Drawing Sheets

(51) Int. Cl.
*G06F 17/24* (2006.01)
*G06F 3/0488* (2013.01)

(56) References Cited

U.S. PATENT DOCUMENTS

| | | | | |
|---|---|---|---|---|
| 2003/0071815 A1* | 4/2003 | Hao | G06T 11/206 | 345/440 |
| 2006/0033752 A1* | 2/2006 | Gering | A61B 6/463 | 345/629 |
| 2006/0082592 A1* | 4/2006 | Black-Ziegelbein | G06T 11/206 | 345/605 |
| 2008/0295038 A1* | 11/2008 | Helfman | G06T 11/206 | 715/853 |
| 2010/0042644 A1* | 2/2010 | Judy | G06F 9/451 | 707/797 |
| 2012/0317518 A1* | 12/2012 | Wittig | G06T 11/206 | 715/853 |

OTHER PUBLICATIONS

Wilkinson, Leland, et al.; "The History of the Cluster Heat Map"; Nov. 18, 2008; 11 pages.

Patro, Anilkumar, et al.; "Pixel Oriented Visualization in Xmdv Tool"; Worcester Polytechnic Institute; Aug. 2004; 97 pages.

Keim, Daniel A.; Designing Pixel-Oriented Visualization Techniques: Theory and Applications; IEEE Transaction on Visualization and Computer Graphics, vol. 6, No. 1; Jan.-Mar. 2000; 20 pages.

Matkovic, Kresimir; "Information Visualization Dense Pixel Displays and Focus + Context"; Vienna University of Technology; Apr. 25, 2012; 9 pages.

Keim, Daniel A., et al.; "Scalable Pixel based Visual Data Exploration"; University of Konstanz, Germany, 2006; 13 pages.

"Data Discovery and Visualization from Data to Dashboards Without Help from IT" obtained at http://www.microstrategy.com/software/business-intelligence/data-discovery-visualization/; downloaded circa Sep. 18, 2012; 5 pages.

"TIBCO Spitfire Analytics Platform" obtained at http://spotfire.tibco.com/en/discover-spotfire/what-does-spotfire-do/data-discovery-and-visualization.aspx; downloaded circa Sep. 18, 2012; 4 pages.

"Answer questions as fast as you can think of them with Desktop"; obtained at http://www.tableausoftware.com/products/desktop; downloaded circa Sep. 18, 2012; 13 pages.

Daniel A. Keim, Ming C. Hao, and Umeshwar Dayal, Hierarchical Pixel Bar Charts, 2002, IEEE Transactions on Visualization and Computer Graphics, vol. 8, No. 3, pp. 255-269.

* cited by examiner

REFORMATING PIXELS THAT REPRESENT OBJECTS

CROSS REFERENCES TO RELATED APPLICATIONS

This application is a continuation of the following U.S. patent application Ser. No. 13/761,614, entitled VISUAL DATA ANALYSIS FOR LARGE DATASETS, filed on Feb. 7, 2013, which is hereby incorporated by reference as if set forth in full in this application for all purposes.

This application is related to the following application, U.S. patent application Ser. No. 13/726,084, entitled VIEWS FOR VISUALIZING LARGE NUMBERS OF NODES, filed on Dec. 22, 2012, which is hereby incorporated by reference, as if set forth in full in this specification:

BACKGROUND

The present application relates to software and more specifically to user interface designs and methods for employing visualizations to graphically display and interact with data and/or concepts.

Visualizations are employed in various demanding applications, including enterprise resource planning, scientific research, digital libraries, data mining, financial data analysis, market studies, manufacturing production control, drug discovery, and so on.

Such applications often involve large datasets, of which a portion or all of the data may be incorporated into a visualization. The data may include patterns and other characteristics that may be illustrated via a visualization. Such applications often demand particularly illustrative visualizations that can reveal patterns and information in the data and facilitate comparisons between data sets.

Illustrative visualizations for visualizing large data sets are particularly important in enterprise applications (e.g., Business Intelligence, Human Capital Management, and so on), where multiple attributes, patterns, and phenomena may exist in granular data to be illustrated via a visualization.

Conventional visualizations, such as pie charts, line graphs, bar graphs, and so on, are typically limited to displaying summarized or aggregated data. More granular data is typically summarized and represented by a portion of a visualization, such as a bar of a bar chart. Unfortunately, patterns potentially existing in underlying granular data are often hidden by the visualizations.

To view underlying data, some visualizations incorporate drill-down functionality, enabling a user to expand or zoom in on a particular portion of a visualization, such as a node, to reveal additional detail. However, performing multiple zooming or drilling operations on individual portions of a visualization may be time consuming and may not provide broader views of granular data between different nodes of a given visualization. Accordingly, important patterns and information among visualization components may remain obscured.

SUMMARY

An example method for illustrating enterprise data includes accessing data from an enterprise application, wherein the data is organized into one or more objects; categorizing the one or more objects based on a grouping criterion, resulting in one or more groups of one or more categorized objects in response thereto; displaying representations of the one or more categorized objects as nodes of a visualization, such that each node is positioned in a section of the visualization according to a group associated with the node, resulting in one or more sections of nodes corresponding to the one or more groups; and adjusting a luminance or brightness of each node based on a node-appearance criterion.

In a more specific embodiment, the step of categorizing further includes providing a user option to specify plural criteria for affecting the visualization, and automatically grouping the one or more objects (in accordance with a combination of criteria chosen from among the plural criteria) to result in display of a set of visualization sections characterized by a section meeting a predetermined constraint or matching a predetermined characteristic. The predetermined constraint may include, for example, a maximum number of least luminous nodes in a section as compared to other sections that would result from different combinations of chosen criteria; a maximum density of least luminous nodes in a section, and so on.

In an illustrative embodiment, the method further includes providing a first user option to adjust the grouping criterion in accordance with a first data attribute. The first data attribute is then visually encoded in the visualization by re-categorizing the one or more categorized objects based on the first data attribute, and re-sectioning the visualization in response thereto. This results in display of new sections with sizes and shapes based on numbers of nodes of each category and based on the first attribute, as specified via the user-adjusted grouping criterion. The first attribute may include a combination of data attributes or sub-attributes, such as a combination of job code and compensation level.

The method may further include providing a second user option to adjust the node-appearance criterion in accordance with a second data attribute, and then visually encoding the second data attribute by adjusting a luminosity of each node based on the second data attribute.

The method may further include sorting each node in each of the one or more sections according to a third criterion. A user option to adjust the third criterion** in accordance with a third data attribute may facilitate visually encoding the third data attribute by a node sort order in response thereto. The node sort order may, for example, be based on a performance evaluation metric associated with persons represented by nodes, and so on. Alternatively, the node sort order may be alphabetical based on names of persons represented nodes; may be a predetermined default sort order, and so on.

The step of adjusting a luminance (also called luminosity herein) of each node may include adjusting a translucence or transparency of each node based on an attribute specified via the node-appearance criterion. In this case, the second attribute is said to be visually encoded in accordance with variations in transparency of each node. The transparency or translucence of each node may be proportional to a value characterizing the second attribute for each node.

The step of adjusting a luminance of each node may include adjusting a luminance of each node relative to a maximum and minimum luminance value of displayed nodes. This may be equivalent to adjusting node contrast in accordance with the node-appearance criterion.

The step of adjusting a luminance of each node may alternatively include generating an oscillation in luminance of each node, when a value of a node as specified via the node-appearance criterion surpasses a threshold. This effectively results in node flickering when a value of an attribute of the node, as specified via the node-appearance criterion, surpasses a threshold value. The threshold value may be a default value or may be user-specified.

The method may further include adjusting dimensions of each section, such that each section is rectangular, and then arranging different sections so that total white space between adjacent sections is minimized and so that the different sections fit within a fixed width assigned to the visualization. A vertical scroll bar may facilitate viewing visualization sections that do not initially fit within a display area of a computer display.

User adjustment to the grouping criterion may trigger re-sectioning of nodes in accordance with one or more data attributes specified via the grouping criterion. The grouping criterion may include a specification of plural data attributes.

Various additional user options may be provided, such as a user option to select one or more rectangular visualization sections to facilitate triggering an action based on a selected visualization section. Example actions include drilling down, rolling up, triggering generation and display of a cross-tabular report for data contained in the selected visualization section, and so on.

Hence, certain embodiments discussed herein provide efficient and illustrative ways to visualize large data sets characterized by potentially thousands of data elements; to thereby facilitate uncovering patterns without having to aggregate data into summary nodes. Very granular enterprise data can be efficiently illustrated via many nodes, which need not represent summarized data from plural data objects. This is facilitated in part by enabling representing data elements as single-pixel nodes, and then varying node luminosity or translucence as a function of (e.g., in proportion to) a data attribute associated with a node to thereby visually encode the data attribute. Any inherent data patterns may be accentuated by enabling further grouping of nodes based on another attribute.

A further understanding of the nature and the advantages of particular embodiments disclosed herein may be realized by reference of the remaining portions of the specification and the attached drawings.

DETAILED DESCRIPTION OF EMBODIMENTS

Figure 1:
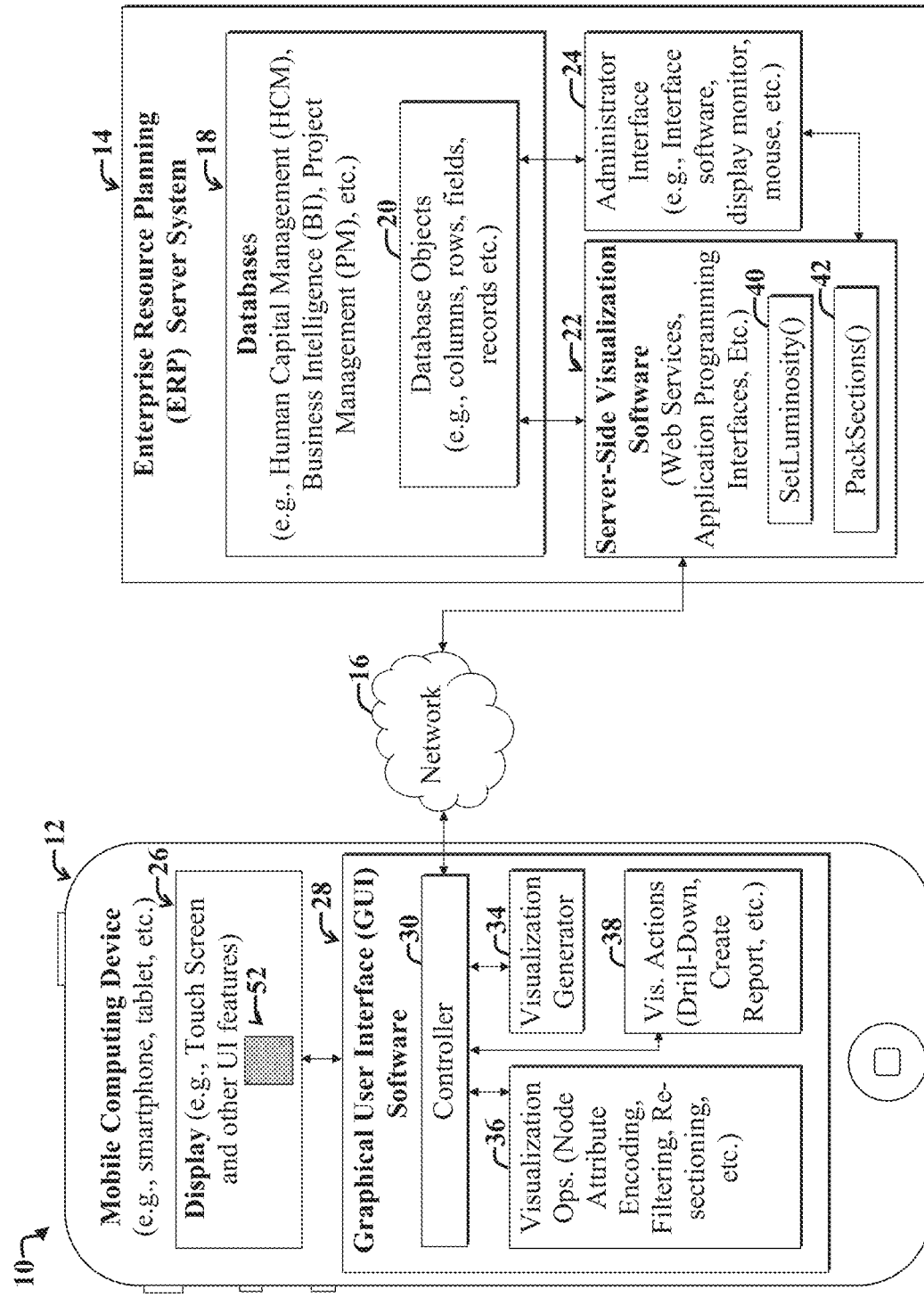
FIG. 1 is a diagram illustrating an example enterprise computing environment and accompanying system for facilitating displaying granular luminosity-based visualizations capable of illustrating granular data of large data-sets.

For the purposes of the present discussion, information visualization may be any process involving graphically representing data according to a method or scheme. A graphical representation of data resulting from an information visualization technique is called a visualization. Example visualizations include pie charts, treemaps, bar charts, line graphs, and so on.

An object, such as a data object, may be any grouping of or encapsulation of data and/or functionality. Examples of objects include classes or structures implemented via object-oriented programming languages; tables, rows, columns, fields, or records, of a database; and so on. An object may include a single item or instance of data, such as a number or other descriptor or attribute, or the object may include plural instances of data and/or functionality (e.g., software methods, such as functions or function calls) and may further include sub-objects.

A representation of an object, i.e., a displayed object, may be displayed via graphical depiction, such as a node of a visualization, a menu item, dialog box, personnel icon, and so on. The graphical depiction of an object may also be called an object, a displayed object, or a node.

Generally, a node may be any graphical representation of an object in a visualization. Note that certain nodes may include sub-nodes, just as an object may include or represent additional objects, i.e., sub-objects. In certain embodiments discussed herein, nodes may be as small as a single pixel of a display screen.

For the purposes of the present discussion, a data attribute (also simply called attribute herein) may be any value or property characterizing data. Accordingly, an attribute of a visualization, node, or associated data, may refer to any characteristic of data used to generate a visualization, where the characteristic may be employed to group or otherwise organize or visually distinguish the data by adjusting features or characteristics of the visualization. Examples of attributes include data dimensions or layers, such as specified by row or column headers of tables used to store the data used for a visualization.

For the purposes of the present discussion, visual encoding (also simply called encoding or coding herein) of a data attribute may be any process involving representing the data attribute graphically. For example, if a hierarchical position of a node in an enterprise organizational chart is used to adjust a size, shape, color, or position, etc., of the node in a visualization, the hierarchical position is said to be visually encoded via the node size, shape, color, or position, respectively.

In various embodiments discussed herein, to facilitate conveying information, visual properties of a node can be varied in accordance with a data attribute (also simply called attribute herein) characterizing the underlying object, i.e., data, thereby visually encoding the attribute. For example, if each node of a visualization is characterized by a performance value, the luminosity or brightness of each node may be scaled as a function (e.g., a linear function) of the performance value associated with the node.

Similarly, a visualization may be sectioned, such that each section contains nodes fitting specified criteria. The criteria may be specified via one or more attributes, such that nodes sharing similar specified attributes or combinations of attributes are grouped into a given section. Note however, that methods for categorizing nodes for grouping and/or visualization sectioning purposes are not limited to grouping of nodes based solely on whether nodes are characterized by similar attributes or combinations thereof. For example, node grouping or sectioning criteria may include specified ranges for different attributes (represented by values), such that nodes characterized by attributes within a similar range are grouped together.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

ERP software may be any set of computer code that is used by an enterprise or organization. Examples of enterprise software classifications include HCM (Human Capital Management) software, CRM (Customer Relationship Management) software; BI (Business Intelligence) software, and so on. Examples of ERP software applications include Financials, Assets, Procurement, Projects, Supply Chain, and so on. The terms "ERP software" and "ERP application" may be employed interchangeably herein.

Enterprise software applications, such as Customer Relationship Management (CRM), Business Intelligence (BI), Enterprise Resource Planning (ERP), and project management software, often include databases with various database objects, also called data objects or entities. An enterprise application that includes or communicates with a database is called an enterprise database application herein.

Enterprise data may be any information pertaining to an organization or business, including information about projects, tasks, resources, orders, enterprise personnel and so on. Examples of enterprise data include descriptions of work orders, asset descriptions, photographs, contact information, calendar information, enterprise hierarchy information (e.g., corporate organizational chart information), and so on.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

FIG. 1 is a diagram illustrating an example enterprise computing environment and accompanying system 10 for facilitating displaying granular luminosity-based visualizations, such as the visualization 52, capable of illustrating granular data of large data-sets.

For the purposes of the present discussion, an enterprise computing environment may be any computing environment used for a business or organization. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

The example system 10 includes a mobile computing device 12 in communication with an Enterprise Resource Planning (ERP) server system 14 via a network 16, such as the Internet. The ERP system 14 includes various databases 18, which store database objects 20.

Server-side software 22, such as web services, Application Programming Interfaces (APIs), and so on, may communicate with the database objects 20 to selectively employ data thereby, such as to facilitate implementation of various software applications, which may include server-side and client-side software applications. Generally, server-side implementations involve running applications on the ERP server 14 in response to a request from a client, such as the mobile computing device 12. The server-side application may then send data and/or instructions back to the client device 12. In client-side implementations, software may be downloaded to the mobile computing device 12 and executed locally on the device 12.

The example ERP server system 14 includes an administrator user interface 24, which may include hardware and software functionality for enabling an administrator to make changes to various components of the ERP server system 14, such a settings, installed software, and so on.

The mobile computing device 12 represents an example client device that communicates with server-side visualization software 22. Note that client devices other than mobile computing devices may be employed without departing from the scope of the present teachings.

The mobile computing device 12 employs a relatively small touch screen 26 (also simply called a display herein) in communication with Graphical User Interface (GUI) software 28, which is adapted to facilitate displaying one or more visualizations 52 via the touch screen 26. The GUI software 28 may be any software application or component, such as a spread sheet program, graphing software, and so on, that is adapted to facilitate displaying graphical user interface features and/or data, such as graphs, menu items, dialog boxes, and so on.

The example GUI software 28 includes a controller 30 in communication with a visualization generator 34, a visualization actions module 38, and a visualization operations module 36. The controller 30 includes computer code for coordinating inputs and outputs to and from the modules 34-38 and interfacing the GUI software 28 and accompanying modules 34-38 with the server-side visualization software 22.

In an example operative scenario, a user employs the mobile computing device 12 to browse to a website hosted by the ERP server system 14, which provides access to the server-side visualization software 22 and accompanying database objects 20. The controller 30 may facilitate downloading database objects 20 from the ERP server system 14 and server-side visualization software 22 for use in constructing a visualization 52 to be displayed via the touch screen 26.

In the present example operative scenario, the GUI software 28 selectively downloads database objects 20 from the ERP server system 18. The visualization generator 34 then employs client-side visualization-generating software to construct one or more visualizations in accordance with instructions included in the controller 30 and input from the touch screen 26.

Initial or default methods and algorithms for organizing nodes into sections based on a grouping criteria; packing nodes into individual sections; sorting nodes within a section, determining node luminosity, translucence (and/or other visual characteristics), and generally for encoding any data attributes (e.g., attributes of the database objects 20) via node characteristics (e.g. node size, color, shape, and so on) may be initially determined by the GUI software 28. Much or all of this processing may be performed server-side, e.g., via the server-side visualization software 22. The client side software 28 may be substantially used for UI rendering and user interaction management. Furthermore, actions, such as setting luminosity, packing sections, and so on, may be substantially performed server-side, e.g., via the server-side visualization software 22.

The controller 30 may facilitate implementing GUI components and user interface controls to provide user options to adjust attribute encoding, as discussed more fully below.

Alternatively, or in addition, attributes (i.e., attributes of data used to generate a visualization) are automatically encoded, such as in accordance with space constraints inherent in a display; numbers of nodes to be illustrated, and so on.

Key functionality for adjusting displayed characteristics of a visualization may be included in various functions (e.g., a SetLuminosity( ) 40 and PackSections( ) function 42) of the server-side visualization software API 22. The example functions 40, 42 may be called remotely via the generator 34 and controller 30 as needed in response to certain user input, or automatically in accordance with instructions included in the controller 30. Alternatively, the functions 40, 42 may be downloaded to the mobile computing device 12 and run client-side.

Note that the server-side visualization software 22 may include additional functionality other than that represented by the example functions 40, 42. For example, functions for facilitating sorting nodes in a section; for sectioning a visualization based on user defined or automatically determined attributes or combinations of attributes, as specified by grouping criteria, and so on, as discussed more fully below. Those skilled in the art with access to the present teachings may readily develop software to implement functionality discussed herein to meet the needs of a given implementation, without undue experimentation.

The example PackSections( ) function 42 of the server-side software 22 may employ a 2-dimensional packing algorithm with code for packing "sections" (squares/rectangles) within the larger rectangular display area, which includes the entire visualization 52. Additional code may be employed to pack nodes of a given group or category into rectangles with sufficient dimensions to fit all of the nodes of the given group within boundaries of a rectangle, leaving no whitespace within the rectangle. Note that for the purposes of the present discussion, a rectangle may be any quadrilateral shape characterize by four right angles. Hence, a square is considered to be a type of rectangle herein.

The PackSections( ) function 42 may further include computer code for sorting nodes in each section of a visualization. When packing nodes in a section, the nodes may initially be arranged in a default sorting order, e.g., alphabetical by last name of persons represented by or corresponding to nodes. In certain implementations, nodes are not specifically sorted based on data attributes, but instead are randomly or pseudo-randomly distributed within a section. User options for adjusting node sort order, visualization sectioning criteria, node-appearance criteria, and so on, may be provided via the GUI software 28 and/or the server-side visualization software 22, as discussed more fully below.

Note that while the example GUI software 28 is shown included in the mobile computing device 12, implementations are not limited thereto. For example, the GUI software 28 may be incorporated into the server-side visualization software 22 and run on the server 14 as a server-side application. The server side application may be run server-side and viewed client-side via browser software running on the mobile computing device 12.

In the present example embodiment, various GUI modules 34-38 include computer code for implementing functionality for adjusting how a visualization is displayed via the touch screen 26. Example operations, which may be implemented in part via the operations module 36, include adjusting attribute encoding, performing filtering operations, adjusting node transparency, luminosity, contrast, and so on.

For the purposes of the present discussion, a software action, also simply called action herein, may be any process or collection of processes implemented via software. Example processes implemented via the visualization actions module 38 include triggering display of additional details of a data object represented via a node of the visualization 52 (i.e., implementing drill-down operations) in response to certain user input (such as a tap gesture applied to a displayed section or node); drilling-down to cause display of additional detail associated with a section of a visualization; zooming in on a particular portion of a visualization; triggering generation and display of a cross-tabular report illustrating data underlying a particular section of a visualization; updating or editing data in a database; changing types of or characteristics of displayed visualizations; launching another ERP software application, and so on.

Figure 2:
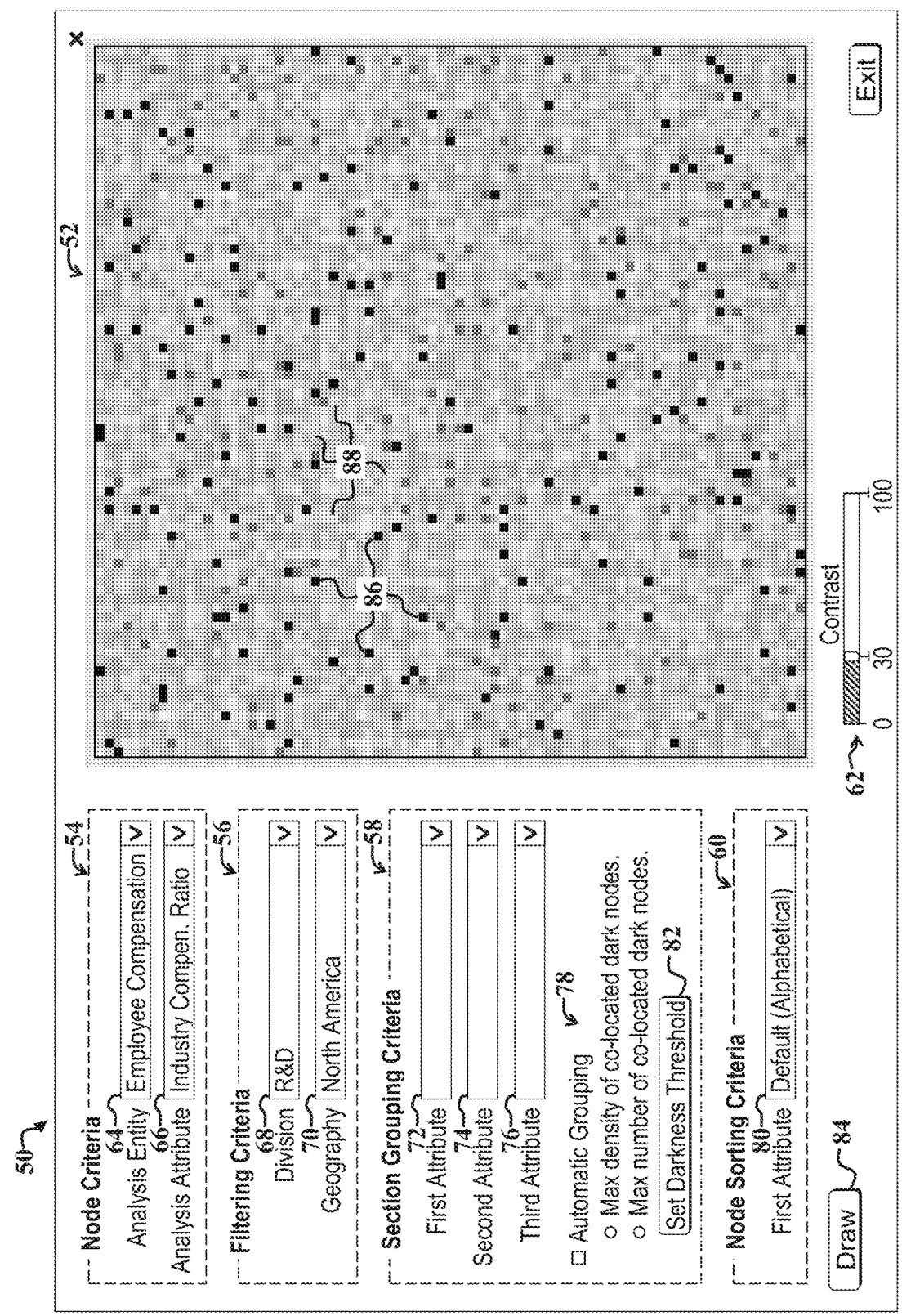
FIG. 2 shows a first example user interface display screen illustrating a first example luminosity-based visualization and user options for selecting data and data attributes and for specifying filtering, grouping, and sorting criteria.

FIG. 2 shows a first example user interface display screen 50 illustrating a first example luminosity-based visualization 52 and various user interface controls 62-84 for providing user options for selecting data and data attributes and for specifying filtering, grouping, sorting criteria, and so on.

For the purposes of the present discussion, a user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

The user interface display screen 50 includes a node criteria section 54 with an analysis-entity drop down menu 64 and an analysis-attribute drop down menu 66. The analysis-entity drop down menu 64 provides user options for selecting an analysis entity, which may be employed by underlying software to select an applicable data source from which to retrieve data used to construct the visualization 52. In the present example embodiment, a user has selected "Employee Compensation" as the analysis entity.

The analysis-attribute drop down menu 66 provides user options for selecting an analysis attribute associated with employee compensation data specified via the analysis-entity drop down menu 64. Note that when a user selects an analysis entity from the analysis-entity drop down menu 64, available options in the analysis-attribute drop down menu 66 may change in accordance with available attributes employable to characterize employee compensation data.

In the present example embodiment, a user has employed the analysis-attribute drop down menu 66 to select "Industry Compensation Ratio" as the analysis attribute. The industry compensation ratio for a given data object used to represent a visualization node may be defined in underlying software to represent a ratio between a compensation amount of a given employee working in a given industry divided by an average industry compensation value for employees with the same/similar job role.

User selections made via the analysis-entity drop down menu 64 and the analysis-attribute drop down menu 66 represent specifications of node criteria, since the selections determine what data objects are represented by individual nodes 86, 88 of the visualization 52 and further determine what values (e.g., industry compensation ratios) are to be visually encoded in the visualization 52. In the present specific embodiment, luminosity values of various nodes 86, 88 of the visualization 52 are adjusted in proportion to associated industry compensation ratios.

For the purposes of the present discussion, node luminosity, also called node luminance herein, may be any measure of an amount of optical energy emitted per unit area per unit time of a region on the display. Accordingly, a dark spot on a screen, which emits little or no light, is characterized by a lower luminosity than a white spot, which emits white light.

Luminosity of a pixel or set of pixels representing a node may be adjusted by making adjustments to pixel brightness. The term brightness may refer to perceived luminosity, as opposed to actual luminosity. However, perceived luminosity may scale according to actual luminosity. Accordingly, brightness and luminosity are employed interchangeably herein.

Relative luminosity between different regions or pixels may be adjusted by making adjustments to contrast. Contrast may be any measure of a difference in luminance and/or color that makes an object (or its representation in an image or display), e.g., a node, distinguishable from other features or components of a visualization. Contrast may be determined by the difference in the color and brightness between displayed nodes.

The example user interface display screen 50 further includes a filtering criteria section 56, which includes a division drop down menu 68 and a geography drop down menu 70. In the present example embodiment, a user has selected Research and Development (R&D) from the division drop down menu 68, resulting in limiting displayed nodes 86, 88 to only nodes representing or corresponding to employees working in an R&D department.

Similarly, a user has selected North America from the geography drop down menu 70, thereby further limiting displayed nodes 86, 88 to only nodes characterized by a geography attribute indicating that the associated employee works in North America. Hence, in the present example embodiment, user specification of filtering criteria involves user specification of attributes associated with nodes.

The example user interface display screen 50 further includes a visualization section grouping criteria section 58, which includes various user interface controls 72-78 for specifying attributes used to group nodes 86, 88 of the visualization 52. A first attribute drop down menu 72, a second attribute drop down menu 74, and a third attribute drop down menu 76 enable users to select combinations of attributes for categorizing and grouping nodes. For example, if three different attributes are selected from the attribute drop down menus 72-76, then nodes sharing all three attributes will be grouped into a similar section; nodes sharing only the first attribute will be grouped into another similar section; nodes sharing only the first two attributes will be grouped into another similar section, and so on. Accordingly, the visualization 52 will be sectioned such that nodes in a given section share a similar combination of shared attributes.

The section grouping criteria section 58 further includes an automatic grouping checkbox 78 and accompanying radio button options. During automatic grouping, underlying software automatically selects combinations of attributes from available attributes to yield visualization sections, such that one or more of the visualization sections will meet certain criteria or conditions. For example, a combination of attributes may be automatically selected such that the resulting sectioned visualization will exhibit a section with the maximum (relative to other attribute combinations) number or density of co-located dark nodes in a given section.

A user may employ radio buttons accompanying the automatic grouping checkbox 78 to specify whether automatic selection of grouping attributes is determined based upon a maximum number or density of co-located dark nodes or a maximum number of co-located dark nodes. Alternatively, the underlying software automatically determines whether to select attributes based on density or number of co-located dark nodes, i.e., least luminous nodes. The term "least luminous" may mean all nodes characterized by luminosity, transparency, or brightness values below a given threshold, where the threshold may be automatically set to a default value or user specified.

A user may specify criteria for determining whether a particular node is considered dark or not by selecting a set-darkness-threshold button 82. User selection of the set-darkness-threshold button 82 may trigger display of an additional user interface display screen, dialog box, or menu with user interface controls for enabling a user to specify a range of luminosity values or translucence values which are considered dark. Alternatively, the set-darkness-threshold button 82 may be replaced with a slider bar that may be adjusted to thereby adjust the threshold(s).

In an example operative scenario, when a user selects the automatic grouping checkbox 78, the attribute drop down menus 72-76 may be updated to show the automatically selected combination of attributes.

A node sorting criteria section 60 includes a first sorting attribute drop down menu 80, which provides user options for specifying how individual nodes should be sorted within a given visualization section. If a user has not specified a sorting criterion via the first sorting attribute drop down menu 80, the underlying software may choose a default sorting attribute, i.e., criterion.

After user selections are made via the various user interface controls 64-80, user selection of a draw button 84 may result in updating of the visualization 52 based on the selections.

In the present example embodiment, the resulting visualization 52 includes one section (since no grouping attributes were selected) representing employee nodes of a research and development department in North America. Node luminosity is varied in proportion to industry compensation ratio associated with each node, thereby resulting in dark nodes 86 characterized by the lowest industry compensation ratios, and light (i.e., luminous or bright) nodes characterized by the highest industry compensation ratios.

Node contrast may be adjusted via contrast slider bar user interface control 62. For the purposes of the present discussion, a slider user interface control may be any user interface control with a graphic that can be positioned or moved to change values or factors corresponding to positions of the graphic. A slider bar may be any movable graphic of a slider user interface control.

Note that while industry compensation ratio is visually encoded via node luminosity in the present example embodiment, embodiments are not limited thereto. For example, nodes other than employee compensation nodes may be shown, and attributes other than industry compensation ratios may be visually encoded via mechanisms other than luminosity variations. For example, variations in node translucence, i.e., transparency, may be employed to visually encode information pertaining to individual nodes, without departing from the scope of the present teachings.

For the purposes of the present discussion, the term translucence refers to the transparency of a pixel to monitor backlight or back illumination, i.e., how much computer display backlight or individual pixel light can pass through the pixel and reach a user's eyes. Accordingly, translucence may effectively be a measure of brightness or luminosity.

However, note that image transparency as established, e.g., via alpha compositing, may represent a different type of transparency, i.e., may represent perceived transparency of a first image relative to a second image that appears to be positioned behind the second image. Nevertheless, either or both types of transparency values may be varied to encode information in visualizations discussed herein, without departing from the scope of the present teachings.

Figure 3:
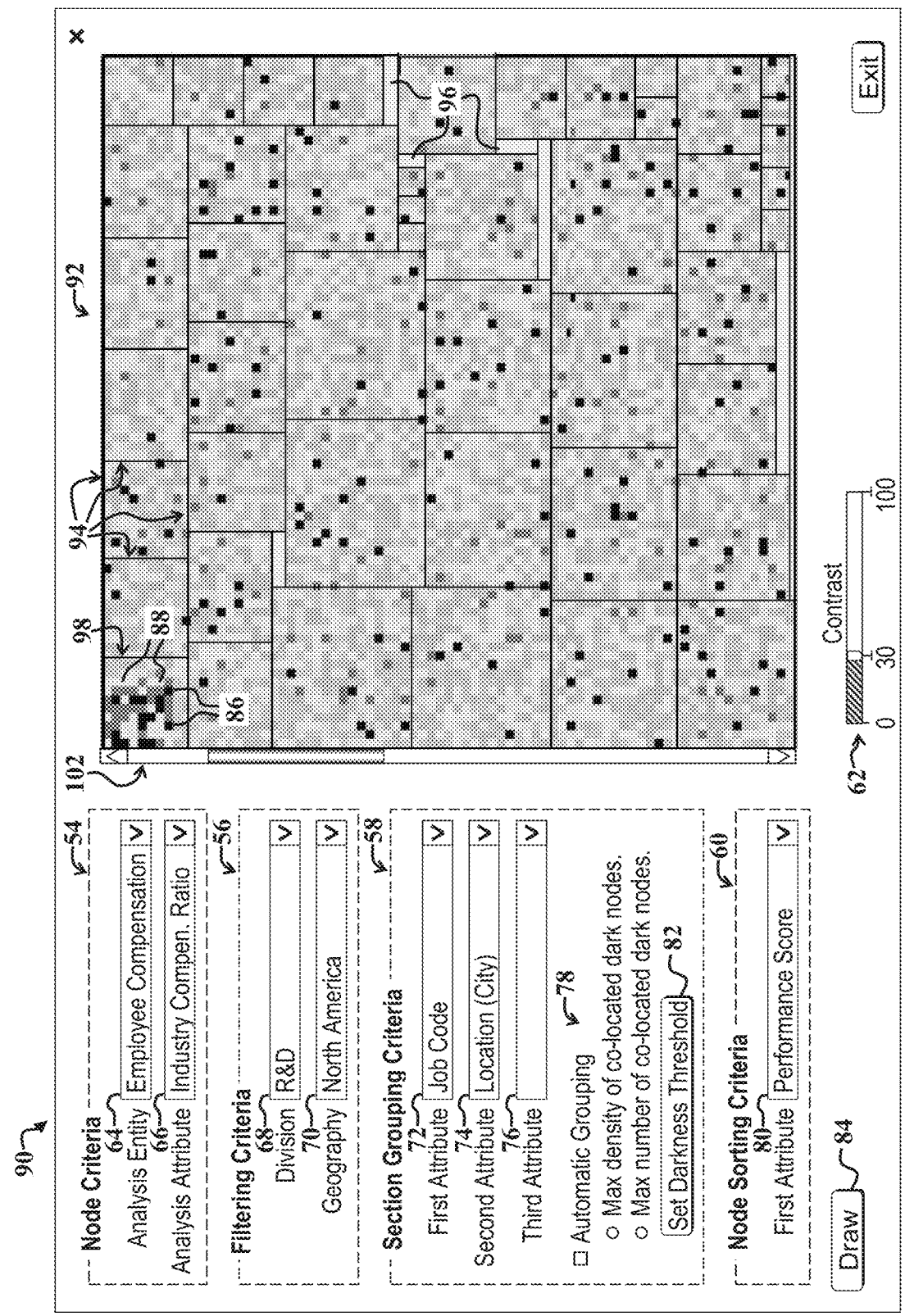
FIG. 3 shows a second example user interface display screen illustrating the luminosity-based visualization of FIG. 2 after a user has specified node grouping criteria.

FIG. 3 shows a second example user interface display screen 90 illustrating the luminosity-based visualization 52 of FIG. 2 after a user has specified node grouping criteria, resulting in an updated sectioned visualization 92. A user has chosen "Job Code" as a first grouping attribute, via the first grouping attribute drop down menu 72 of the section grouping criteria section 58. A user has chosen "Location" as a second grouping attribute, via the second grouping attribute drop down menu 74.

Underlying software, e.g., the GUI software 28 of FIG. 1 has then sectioned the visualization 92 into various sections 94, including an upper leftmost section 98. The upper leftmost section 98 is characterized by a higher number and density of darks spots than other sections 94 of the visualization.

Each section 94 represents a collection of nodes sharing similar combinations of job code and location attributes. Furthermore, nodes in each section 94 (including section 98) are sorted by performance evaluation scores or metrics associated with employees represented by each node. The performance evaluation score sorting criteria, i.e., attribute, has been user selected via the first sorting attribute drop down menu 80.

The sections 94 are packed in a limited display area via a packing algorithm that minimizes white space 96 between sections 94. Different sections 94 may have different dimensions depending upon the number of nodes in each section and depending upon a packing algorithm or function used to pack the nodes in a section. In certain implementations, additional sections, which do not fit within the horizontal display dimension allocated for the visualization 92, may be viewed by actuating a vertical scroll bar 102.

In the present example embodiment, each displayed node of the visualization 92 represents an employee. The visualization 92, which includes approximately 6400 four-by-four pixel nodes (with sixteen pixels per node), illustrates data pertaining to approximately 6400 employees. Note that each node may be represented by single pixel nodes or other numbers or dimensions of nodes, without departing from the scope of the present teachings Accordingly, the visualization 92 illustrates very granular data via methods that facilitate ascertaining patterns in the data. For the purposes of the present discussion, granular data may represent a data element that is not representative of a summarization or a total of values derived from other data objects or other data elements. A data element may be any portion of data that is a most discrete unit of data contained in or associated with a given data object.

In an example operative scenario, a user is interested in ratio of employee compensation to industry average for that employee's job code. The higher the ratio, the more translucent and/or brighter the point. The user might attempt to group or section nodes by various individual attributes or combinations of attributes available for the displayed nodes. Other example grouping attributes, which may be available via the grouping attribute drop down menus 72-74, include department, cost center, and so on.

When a user specifies a grouping attribute or combination of grouping attributes as criteria for sectioning the visualization 92, underlying software may perform various steps, including collecting all data objects for each visualization section 94 (i.e., each group of nodes to be included in each section) based on the selected grouping attributes; for each grouped set of data objects, creating a square or rectangle closest to a square to accommodate nodes corresponding to the data object being grouped; and drawing all of the squares and rectangles, representing visualization sections 94, on the display screen 90.

The underlying software will then pack the squares and rectangles, i.e., sections 94, in the allocated screen area with minimum whitespace. In implementations that exhibit whitespace 96 in the visualization 92, the screen area used for the sectioned visualization 92 may be larger than that used for the un-sectioned visualization (e.g., the visualization 52 of FIG. 2). Accordingly, the underlying software may stretch the effective screen area vertically (e.g., by providing the scroll bar 102) while keeping the width constant; allowing the user to scroll vertically to view all plotted data.

After sectioning of the visualization 92, the visualization 92 will illustrate grouped data, represented via the visualization sections 94. A user may view the sections 94 to ascertain data patterns or other phenomena of interest. For example, the upper leftmost section 98 illustrates a potential area of interest due to the visually distinguished distribution of dark nodes 86 therein.

The first section 98 may correspond to, for example, job code 001 for location San Francisco. In this case, the visualization 92 may draw the user's attention to San Francisco employees with job code 001. The distribution of dark nodes 86 and light nodes 88 in the upper leftmost section 98 may imply that some employees are highly compensated and others much lower within the same job code. Furthermore, the distribution anomaly is evident for a group of approximately 100 employees out of several thousands of employees. Such an anomaly could be very difficult to discern using any currently widely available enterprise data visualization software or methods, which typically employ visualizations with nodes representing summarized or aggregated data.

Specifying further grouping criteria applicable to the section of interest 98 may yield additional patterns and insight. For example, in certain implementations, as discussed more fully below, user options may be provided to enable user selection of a visualization section and subsequent drill-down, zooming, and/or focusing operations. For example, a new visualization may be created that only shows nodes pertaining to the section of interest 98. Additional grouping criteria, node criteria, and sorting criteria could be added to the resulting visualization to further facilitate revealing additional patterns, anomalies, characteristics, and insight.

For example, after converting the section 98 of interest in a new visualization, a user may further group or section the section 98 by years of service in the enterprise. Doing so may reveal, for example, that the newly hired employees were able to command higher salaries initially, but those with longer tenures have compensations that lag behind within the specified job code and location. This could be valuable insight that was otherwise not possible to obtain.

In addition, the underlying software may include computer code enabling users to select one or more sections of the visualization 92 and perform additional actions, such as triggering generation of a tabular report for nodes in the selected section.

User options may also be provided for removing noise from underlying data by filtering out, for example, employees that received "poor" performance ratings or scores or for removing employees who rank below industry norms based on certain performance evaluation metrics, and so on.

Figure 4:
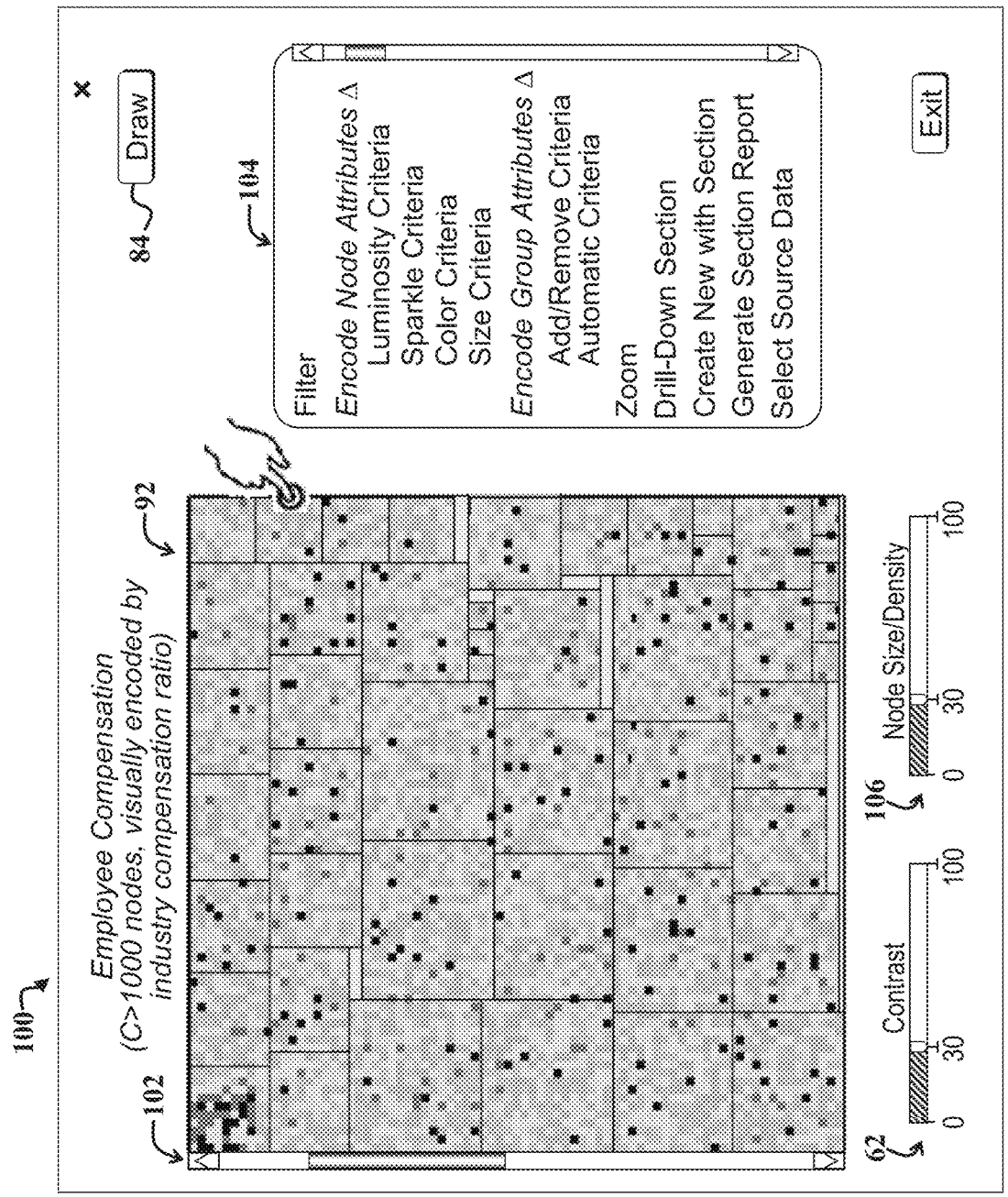
FIG. 4 shows a third example user interface display screen illustrating the luminosity-based visualization of FIG. 3, which is adapted for use with touch-screen inputs.

FIG. 4 shows a third example user interface display screen 100 illustrating the luminosity-based visualization 92 of FIG. 3, which is adapted for use with touch-screen inputs. The third example user interface display screen includes a node size slider bar control 106 in addition to the contrast slider bar control 62.

Actuation of the node slider control 106, such as by dragging the accompanying slider bar to the left, may reduce node sizes, thereby enabling more sections to fit within the available area for the visualization 92. The underlying software may then redraw and repack sections of the visualization 92. If all sections can then fit within the available viewing area, the slider bar control 102 may be omitted. Alternatively, scrolling is implemented via a touch gesture, such as via a single finger upward or downward swipe on a region of the display screen 100 coinciding with the visualization 92.

For the purposes of the present discussion, touch input may be any input, such as input via a gesture, provided to a computing device via a touch-sensitive display. A gesture may be any movement that involves motion to trigger a signal to control or otherwise affect a user interface display screen.

In the present example embodiment, a user has employed a tap and hold touch gesture to activate a menu 104 with various user options. The user options include a filtering option, a node attribute encoding section, a group attribute encoding section, a zoom option, a drill-down option, a create-new-section option, a generate section report option, and a select source data option.

The node attribute encoding section includes user options for specifying node luminosity criteria, sparkle criteria, color criteria, and node size criteria. The group attribute encoding section includes user options for adding and/or removing criteria (e.g., by specifying or de-specifying grouping attributes), and a user option to trigger automatic grouping criteria selection and visualization sectioning.

Selection of a user option from the drop down menu 104 may trigger display of an additional user interface display screen with additional user interface controls and input fields to enable users to set criteria, choose additional options, and so on. For example, if a user selects a user option to activate a sparkle effect, an additional user interface display screen may appear with options to specify ranges of industry compensation ratios (e.g., by setting upper and/or lower thresholds) that should exhibit a sparkle effect.

A sparkle effect may be implemented by varying the luminosity, color, transparency, or other characteristic of a node. The rate at which the luminosity (or other visual characteristic) of a node oscillates may also be user-specified via a user interface display screen that appears in response to selection of the sparkle criteria user option of the drop down menu 104.

Hence, node sparkle may refer to an oscillation in luminance of each node, when a value of a node as specified via a node-appearance criterion surpasses a threshold, falls below a threshold, or falls between specified thresholds. Generating oscillations in node luminance when a node-appearance criterion (e.g., node attribute) surpasses a given threshold effectively results in node flickering when the value of an attribute of the node, as specified via the node-appearance criterion, surpasses a threshold value. The threshold value may be a default value or may be user-specified.

Figure 5:
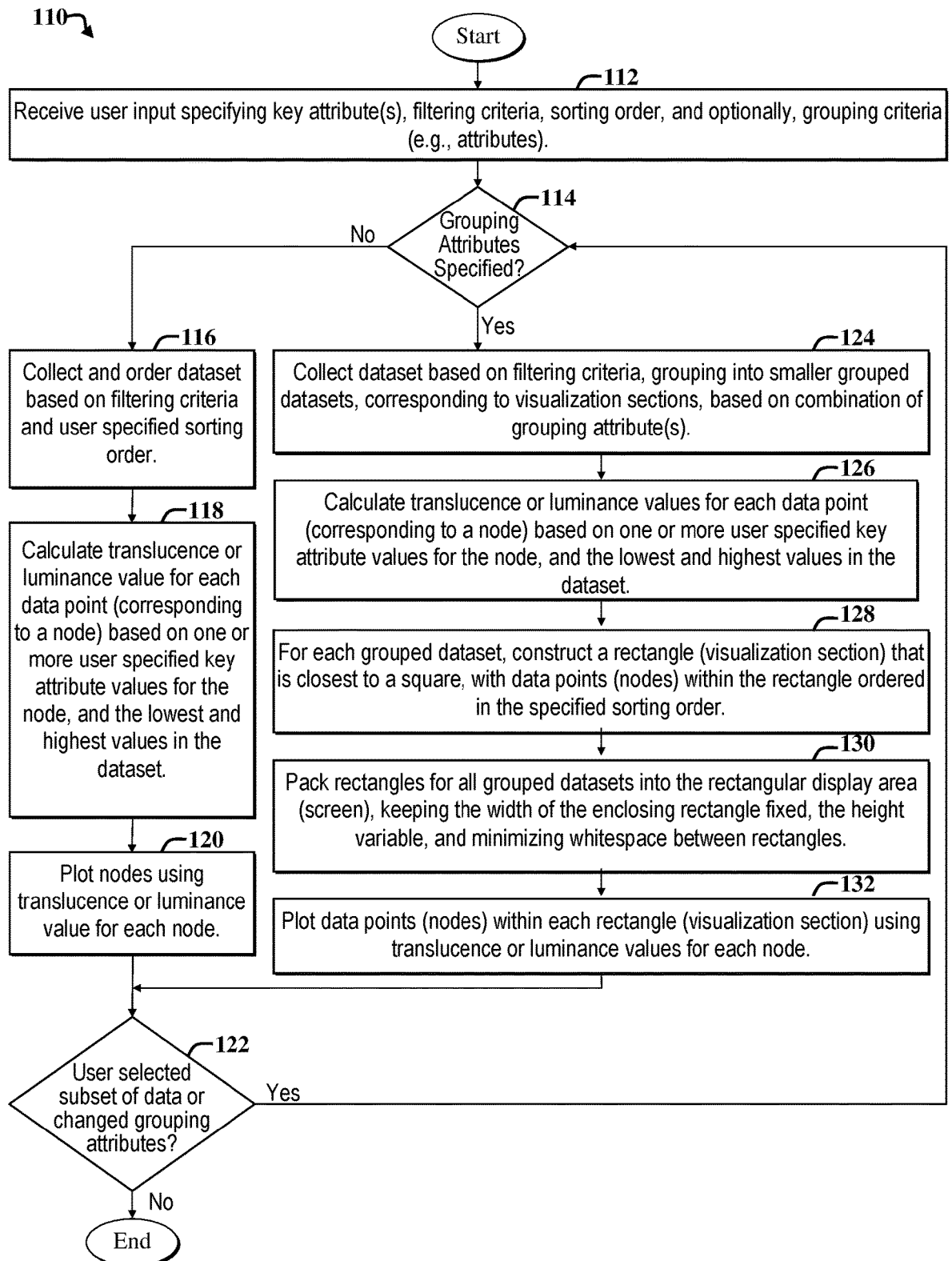
FIG. 5 is a diagram of an example process flow adapted for use with the embodiments of FIGS. 1-4.

FIG. 5 is a diagram of an example process flow 110 adapted for use with the embodiments of FIGS. 1-4. The example process 110 includes an initial input-receiving step 112, which involves receiving user input specifying key attribute(s), filtering criteria, node sorting order, and optionally, node grouping criteria (e.g., attributes).

A subsequent attribute-checking step 114 includes determining whether node grouping attributes (representing visualization sectioning criteria) have been user-specified. If a user has not specified node grouping attributes, then control is passed to a data collecting step 116.

The data collecting step 116 includes collecting a set of data (i.e., dataset) from a predetermined data source based on user-specified filtering criteria, and ordering data objects of the dataset based on a user-specified node sorting order.

Subsequently, a translucence calculating step 118 includes calculating or otherwise determining a translucence or luminance value for each data object (corresponding to a node) based on one or more user-specified key attribute values for the node, and the lowest and highest values in the dataset.

Calculation of translucence values may be based on each data point's specified attribute value and the range of all values to be plotted. For the present employee compensation example, the key attribute is ratio of employee compensation to industry average (i.e., industry compensation ratio) for that employee's job code. The translucence value may be between 0.00 and 1.00, where a translucence value of 1.00 represents a fully transparent node (bright white point), and 0.00 represents a completely opaque node (black point).

For a specific employee with employee compensation ratio (E), the representative node (also called data point herein), the resulting translucence value may be defined as $(E-L)/(H-L)$, where L represents the lowest value for the industry compensation ratio (among all displayed nodes), and H represents the highest value industry compensation ratio (among all displayed nodes).

Subsequently, a node plotting step 120 includes plotting nodes, in a region of a display screen allocated for a visualization, using the determined translucence or luminance value for each node. Subsequently, control is passed to a subset-checking step 122.

The subset-checking step 122 includes determining whether or not a user has selected a subset of data displayed via a visualization (e.g., by selecting a section of a sectioned visualization or by specifying additional node attributes or criteria) and whether or not a user has changed grouping criteria or attributes. If a user has selected a data subset or changed grouping attributes, then control is passed back to the attribute-checking step 114.

If the attribute-checking step 114 determines that a user has specified grouping attributes or criteria, then control is passed to a second data collecting step 124.

The second data collecting step 124 includes collecting a dataset based on user-specified filtering criteria, and then grouping the dataset into smaller grouped datasets, corresponding to visualization sections, based on a user-specified combination of grouping attribute(s). Subsequently, control is passed to a second calculating step 126.

The second translucence calculating step 126 is similar to the first translucence calculating step 118. Subsequently, a visualization sectioning step 128 is performed.

The visualization sectioning step 128 includes, for each grouped dataset, constructing a rectangle (visualization section) that is closest to a square, with data points (nodes) within the rectangle ordered in the user-specified sorting order.

A subsequent packing step 130 includes packing the rectangles for all grouped datasets into the rectangular display area (screen), keeping the width of the enclosing rectangle fixed, the height variable, and minimizing whitespace between rectangles.

Next, a second plotting step 132 includes plotting data points (nodes) within each rectangle (visualization section) using the determined translucence or luminance values for each node. Subsequently, control is passed back to the subset-checking step 122.

Figure 6:
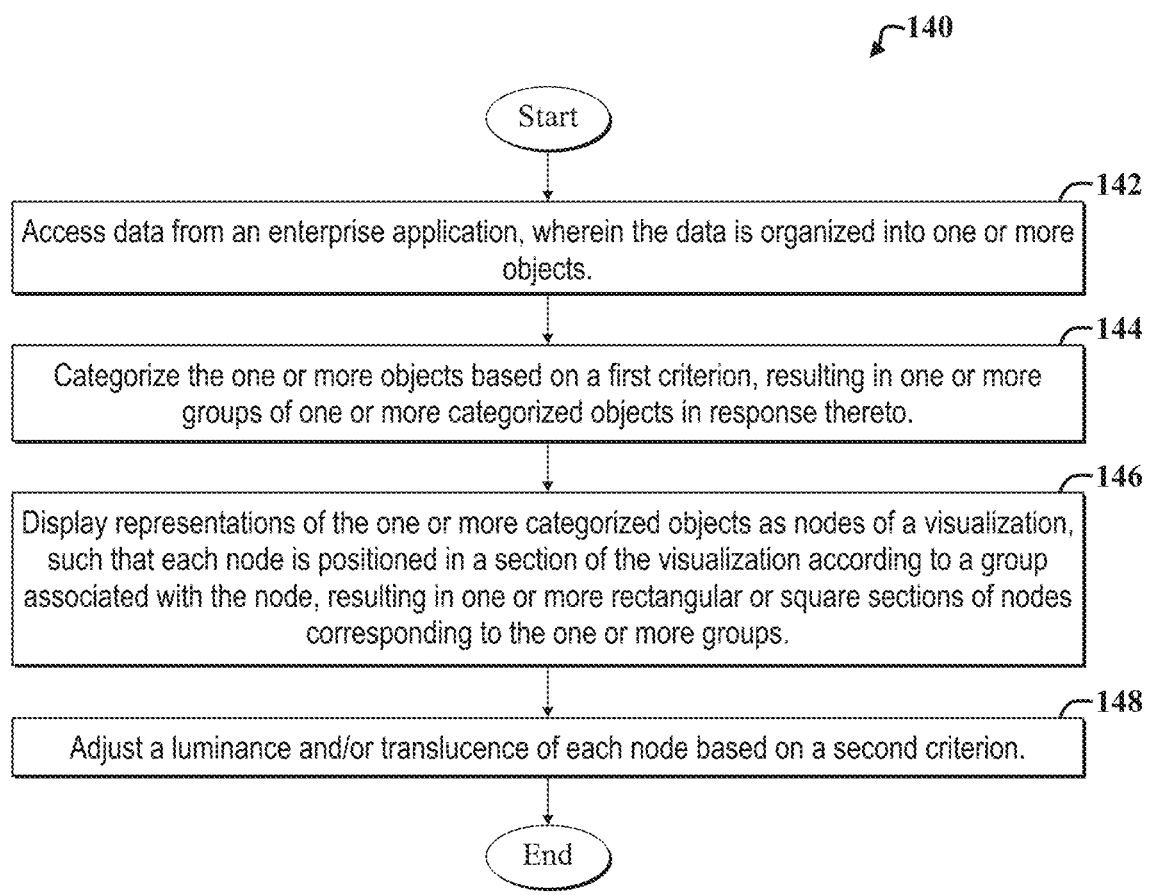
FIG. 6 is a flow diagram of an example method adapted for use with the embodiments of FIGS. 1-5.

FIG. 6 is a flow diagram of an example method 140 adapted for use with the embodiments of FIGS. 1-5. The example method 140 for illustrating enterprise data includes a first step 142, which involves accessing data from an enterprise application, wherein the data is organized into one or more objects.

A second step 144 includes categorizing the one or more objects based on a first criterion, resulting in one or more groups of one or more categorized objects in response thereto.

A third step 146 includes displaying representations of the one or more categorized objects as nodes of a visualization such that each node is positioned in a section of the visualization according to a group associated with the node, resulting in one or more sections of nodes corresponding to the one or more groups.

A fourth step 148 includes adjusting a luminance of each node based on a second criterion.

Although the description has been described with respect to particular embodiments thereof, these particular embodiments are merely illustrative, and not restrictive. For example, while various embodiments discussed herein apply to a specific example concerning employee compensation, implementations may apply to a broad set of business area problems.

Embodiments discussed herein may provide particular benefits to enterprises by addressing a need to ascertain patterns of interest across a large number of data points, which may preexist in various enterprise databases and accompanying data repositories.

Other embodiments may address, for example, use of visualizations discussed herein to ascertain patterns pertaining to high rejection rates across supplier-item shipment combinations. Filtering criteria could be all direct materials shipments, received over a specific period of time, at all receiving locations in Eastern United States. Key analysis attributes in this case may be rejection rate for each shipment of supplier-item received (e.g., the ratio of the number of rejected items to the number of shipped items). Grouping attributes could be supplier, item, receiving location, and so on.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory processor-readable storage device including instructions executable by a digital processor for executing a method for illustrating non-aggregated data, the non-transitory processor-readable storage device including one or more instructions for:

receiving, at graphical user interface (GUI) software, first user specified criteria wherein the first user specified criteria include an analysis entity and an analysis attribute;

automatically displaying, via the GUI software, a first visualization based on the first user specified criteria, wherein the first visualization defined by a rectangular area having a fixed width dimension and variable height dimension, wherein the first visualization includes pixels that each represent one of objects, wherein a particular pixel is at a first position in the first visualization, and wherein first patterns and first contrasts in the non-aggregated data are displayed by generating color for each of the pixels and generating oscillation in luminance of each of the pixels based on a threshold;

receiving, at the GUI software, a second user specified criteria includes grouping criteria for grouping the pixels based on which subset of the grouping criteria the non-aggregated data associated with the pixels satisfies;

creating groups of categorized objects by categorizing the objects based on the second user specified criterion; and automatically displaying, via the GUI software, a second visualization that includes the pixels by automatically reformatting the particular pixel from the first position to a second position based on the second user specified criteria, wherein the pixels are grouped based on which subset of the grouping criteria the non-aggregated data associated with the pixels satisfies, wherein second patterns and second contrasts in the non-aggregated data are displayed, intentionally in response to the second user specified criteria, by generating color for each of the pixels and generating oscillation in luminance of each of the pixels based on the threshold.

2. The non-transitory processor-readable storage device as recited by claim 1, wherein the method further comprises:
displaying representations of the categorized objects as the pixels of the second visualization such that each pixel is positioned in a section of the second visualization according to a group associated with the pixel, resulting in sections of the pixels corresponding to the groups.

3. The non-transitory processor-readable storage device as recited by claim 2, wherein the method further comprises:
arranging the pixels within each of the sections such that a shape of each of the sections is adjusted closest to a square shape that leaves no whitespace within each of the sections.

4. The non-transitory processor-readable storage device as recited by claim 2, wherein the method further comprises:
arranging the sections within the second visualization to reduce formation of whitespace between the sections and to fit the sections within the fixed width dimension of the second visualization while allowing changes to a height of the second visualization.

5. The non-transitory processor-readable storage device as recited by claim 1, wherein the method further comprises:
adjusting a luminance of each pixel based on the first user specified criteria.

6. The non-transitory processor-readable storage device as recited by claim 1, wherein the method further comprises:
receiving third user specified criteria for grouping that is different from the second user specified criteria; and
re-sectioning the pixels based on the third user specified criteria.

7. The non-transitory processor-readable storage device as recited by claim 1, wherein the method further comprises:
associating a hierarchical position in an enterprise chart with the particular pixel of the pixels; and
adjusting a visual property of the particular pixel based on the hierarchical position.

8. The non-transitory processor-readable storage device as recited by claim 7, wherein the method further comprises:
selecting the visual property from a group consisting of size, shape, color and position.

9. The non-transitory processor-readable storage device as recited by claim 1, wherein the method further comprises:
executing the GUI software on a mobile computing device.

10. The non-transitory processor-readable storage device as recited by claim 1, wherein the method further comprises:
triggering display of additional details of an object associated with the particular pixel of the pixels in response to a user input to the GUI software.

11. The non-transitory processor-readable storage device as recited by claim 1, wherein the method further comprises:
receiving the first user specified criteria that pertains to a group consisting of compensation, geography and a division of an organization.

12. The non-transitory processor-readable storage device as recited by claim 1, wherein the group criteria includes a plurality of attributes and the method further comprises:
creating the groups based on the plurality of attributes.

13. The non-transitory processor-readable storage device as recited by claim 1, wherein the method further comprises:
assigning pixels that share a similar combination of attributes to a section.

14. The non-transitory processor-readable storage device as recited by claim 1, wherein the method further comprises:
receiving a user specified automatic grouping request; and
in response to the user specified automatic grouping request, automatically selecting combinations of attributes from available attributes for grouping the pixels into sections of the second visualization.

15. The non-transitory processor-readable storage device as recited by claim 14, wherein the method further comprises:
maximizing co-located dark pixels based on the automatically selecting of the combinations of the attributes.

16. The non-transitory processor-readable storage device of claim 1, wherein the method further comprises:
graphically representing the data according to a scheme;
wherein each object of the categorized objects comprises an encapsulation of particular data and functionality;
wherein the categorized objects are classes, structures implemented via object-oriented programming languages, database tables, database rows, database columns, database fields, or database records;
wherein at least one object of the categorized objects consists of a single number;
wherein at least one object of the categorized objects includes plural instances of the particular data and functionality;
wherein the functionality includes functions and function calls;
wherein at least one object of the categorized objects includes sub-objects;
wherein displaying representations of the categorized objects as pixels of the second visualization comprises displaying a representation of a particular object as a menu item, dialog box, or personnel icon;
wherein each pixel is a graphical representation of an object in the second visualization;
wherein the data accessed from an application has attributes;
wherein the attributes include data dimensions and layers;
wherein the data dimensions and layers are specified by column headers of tables used to store the data accessed from the application;
wherein displaying representations of the categorized objects comprises encoding the attributes;
wherein the encoding of the attributes comprises encoding a hierarchical position of a pixel in an organizational chart;
wherein the encoding of the hierarchical position of the pixel in the organizational chart comprises adjusting a size, shape, color, and position of a pixel in the second visualization;
wherein the second user specified criteria is specified via at least one of the attributes;
wherein arranging the pixels within each of sections comprises grouping, into a particular section of the sections, pixels sharing combinations of the attributes;
wherein the second user specified criteria specifies a range for the attributes;

wherein arranging the pixels within each of the sections comprises grouping, into the particular section of the sections, pixels characterized by those of the attributes that are within the range;

wherein the data accessed from the application include information about projects, tasks, resources, orders, personnel, descriptions of work orders, asset descriptions, photographs, contact information, calendar information, and corporate organizational chart information;

wherein the data accessed from the application are stored in a plurality of databases included within a server system that is in communication with a mobile computing device via an Internet;

wherein the server system belongs to a set of computing resources distributed across a network;

wherein the computing resources include private and shared content on Intranet Web servers, databases, files on local hard discs, files on file servers, email systems, document management systems, and portals;

wherein the server system comprises server-side software that comprises web services and Application Programming Interfaces (APIs);

wherein the server system includes an administrator user interface;

wherein the administration user interface includes include hardware functionality and software functionality that enables an administrator to make changes to components of the server system;

wherein the mobile computing device employs a touch screen that is in communication with Graphical User Interface (GUI) software;

wherein displaying the representations of the categorized objects as pixels of the visualization comprises the GUI software displaying the second visualization on the touch screen;

wherein the GUI software is a spreadsheet program that displays graphs, menu items, and dialog boxes; and wherein the GUI software includes a controller that is in communication with a visualization generator, a visualization actions module, and a visualization operations module.

17. The non-transitory processor-readable storage device of claim 16, wherein the method further comprises:

varying visual properties of a particular pixel in the second visualization in accordance with the attributes by scaling a luminosity of the particular pixel as a linear function of a performance value associated with the particular pixel;

selectively employing, by the server-side software communicating with the categorized objects, data to facilitate implementations of software applications, including particular server-side and particular client-side software applications;

running, by implementations of particular server-side software applications, applications on a server in response to a request from the mobile computing device;

sending, by the implementations of the particular server-side software applications, instructions to the mobile computing device;

downloading, to the mobile computing device, by the implementations of the particular client-side software applications, downloadable software;

executing the downloadable software on the mobile computing device;

coordinating, by the controller, inputs to and outputs from the visualization generator, the visualization actions module, and the visualization operations module;

interfacing, by the controller, the GUI software, the visualization generator, the visualization actions module, and the visualization operations module with visualization software on the server system;

browsing, by the mobile computing device, a website that is hosted by the server system and that provides access to both the visualization software on the server system and the categorized objects;

downloading, by the controller, the categorized objects from the visualization software on the server system;

constructing the second visualization using the visualization software;

providing user options to adjust attribute encoding;

wherein the arranging comprises employing a 2-dimensional packing algorithm configured to pack the sections within the second visualization;

grouping the pixels such that pixels within each of the sections share a similar combination of shared attributes;

arranging pixels disposed within each of the sections randomly or pseudo-randomly; and in response to user input triggering display of additional details of a data object represented via a pixel of the second visualization.

18. An apparatus comprising:

a server system coupled to a display and to a processor-readable storage device, wherein the processor-readable storage device includes one or more instructions executable by the server system to perform the following acts:

receiving, at graphical user interface (GUI) software, first user specified criteria wherein the first user specified criteria include an analysis entity and an analysis attribute;

automatically displaying, via the GUI software, a first visualization based on the first user specified criteria, wherein the first visualization defined by a rectangular area having a fixed width dimension and variable height dimension, wherein the first visualization includes pixels that each represent one of objects, wherein a particular pixel is at a first position in the first visualization, and wherein first patterns and first contrasts in non-aggregated data are displayed by generating color for each of the pixels and generating oscillation in luminance of each of the pixels based on a threshold;

receiving, at the GUI software, a second user specified criteria includes grouping criteria for grouping the pixels based on which subset of the grouping criteria the non-aggregated data associated with the pixels satisfies;

creating groups of categorized objects by categorizing the objects based on the second user specified criterion; and automatically displaying, via the GUI software, a second visualization that includes the pixels by automatically reformatting the particular pixel from the first position to a second position based on the second user specified criteria, wherein the pixels are grouped based on which subset of the grouping criteria the non-aggregated data associated with the pixels satisfies, wherein second patterns and second contrasts in the non-aggregated data are displayed, intentionally in response to the second user specified criteria, by generating color for each of the pixels and generating oscillation in luminance of each of the pixels based on the threshold.

19. A method for illustrating non-aggregated data, the method comprising:
   receiving, at graphical user interface (GUI) software, first user specified criteria wherein the first user specified criteria include an analysis entity and an analysis attribute;
   automatically displaying, via the GUI software, a first visualization based on the first user specified criteria, wherein the first visualization defined by a rectangular area having a fixed width dimension and variable height dimension, wherein the first visualization includes pixels that each represent one of objects, wherein a particular pixel is at a first position in the first visualization, and wherein first patterns and first contrasts in the non-aggregated data are displayed by generating color for each of the pixels and generating oscillation in luminance of each of the pixels based on a threshold;
   receiving, at the GUI software, a second user specified criteria includes grouping criteria for grouping the pixels based on which subset of the grouping criteria the non-aggregated data associated with the pixels satisfies;
   creating groups of categorized objects by categorizing the objects based on the second user specified criterion; and
   automatically displaying, via the GUI software, a second visualization that includes the pixels by automatically reformatting the particular pixel from the first position to a second position based on the second user specified criteria, wherein the pixels are grouped based on which subset of the grouping criteria the non-aggregated data associated with the pixels satisfies, wherein second patterns and second contrasts in the non-aggregated data are displayed, intentionally in response to the second user specified criteria, by generating color for each of the pixels and generating oscillation in luminance of each of the pixels based on the threshold.

20. The method as recited by claim 19, wherein the method further comprises:
   accessing the data from an enterprise application, wherein the data is organized into the objects.

21. The non-transitory processor-readable storage device of claim 1, wherein the grouping criteria includes three attributes and wherein the method further comprises:
   grouping a first subset of the pixels together that share all three of the attributes;
   grouping a second subset of the pixels together that share two of the attributes; and
   grouping a third subset of the pixels together that share one of the attributes.

22. The non-transitory processor-readable storage device of claim 21, wherein the three attributes include job code, location, department, cost center, and years of service.

* * * * *

UNITED STATES PATENT AND TRADEMARK OFFICE
CERTIFICATE OF CORRECTION

PATENT NO. : 10,593,078 B2
APPLICATION NO. : 15/289821
DATED : March 17, 2020
INVENTOR(S) : Srivastava Page 1 of 1

It is certified that error appears in the above-identified patent and that said Letters Patent is hereby corrected as shown below:

On the Title Page

Item (54), Column 1, under Title, Line 1, delete "REFORMATING" and insert -- REFORMATTING --, therefor.

In the Specification

In Column 1, Line 1, delete "REFORMATING" and insert -- REFORMATTING --, therefor.

In Column 1, Line 16, delete "specification:" and insert -- specification. --, therefor.

In Column 11, Line 48, after "teachings" insert -- . --.

In the Claims

In Column 16, Line 45, in Claim 1, after "criteria" insert -- , --.

In Column 19, Line 26, in Claim 16, after "includes" delete "include".

In Column 20, Line 35, in Claim 18, after "criteria" insert -- , --.

In Column 21, Line 6, in Claim 19, after "criteria" insert -- , --.

Signed and Sealed this
Tenth Day of November, 2020

Andrei Iancu
*Director of the United States Patent and Trademark Office*